United States Patent

Dutcher

[11] Patent Number: 5,927,610
[45] Date of Patent: Jul. 27, 1999

[54] FERTILIZER DISPENSING APPARATUS

[76] Inventor: Timothy Bennett Dutcher, 808 Harbour View Dr., Kill Devil Hills, N.C. 27948

[21] Appl. No.: 08/641,907

[22] Filed: May 2, 1996

[51] Int. Cl.$^6$ .............................. B05B 7/28; B01D 11/02
[52] U.S. Cl. ............................................ 239/317; 137/268
[58] Field of Search .................................... 239/310, 313, 239/315, 316, 317; 137/268

[56] References Cited

U.S. PATENT DOCUMENTS

| | | | |
|---|---|---|---|
| 563,921 | 7/1896 | Gridley | 137/268 X |
| 1,245,626 | 11/1917 | Shaffer | 239/315 X |
| 1,321,586 | 11/1919 | Bachman | 137/268 |
| 2,064,178 | 12/1936 | Pickard | 239/315 X |
| 3,343,918 | 9/1967 | Moulder | 239/310 X |
| 3,937,399 | 2/1976 | Halley | 239/1 |
| 4,340,179 | 7/1982 | Knapp | 239/310 |
| 4,898,202 | 2/1990 | Craig | 137/268 |
| 4,936,335 | 6/1990 | Macon | 137/268 |
| 5,181,533 | 1/1993 | Kooi | 137/268 |

FOREIGN PATENT DOCUMENTS

| | | | |
|---|---|---|---|
| 273416 | 7/1927 | United Kingdom | 239/315 |

Primary Examiner—Andres Kashnikow
Assistant Examiner—Steven J. Ganey
Attorney, Agent, or Firm—Carnes Cona & Dixon

[57] ABSTRACT

The present invention provides for a dispensing apparatus which will successfully disperse a minute amount of fertilizer during each watering of gardens, lawns, or the like. The apparatus of the present invention includes an inner chamber which is housed within an outer chamber. The inner chamber maintains a water soluble fertilizer and also includes an inlet and an outlet. An inlet and outlet is also at the outer ends of the outer chamber. A gap or space is situated between the inner chamber and outer chamber. For utilizing the device of the present invention, the user attaches a conventional water source to the inlet of the outer chamber while a water discharge device is secured to the outlet of the device. Water enters the inlet of the outer chamber and flows into the space or gap as well as enters the inner chamber via the inlet. The water within the inner chamber causes the fertilizer to dissolve and form a solution. This solution exits the inner chamber via the outlet. At the outlet of the inner chamber, the fresh water from the gap or space mixes with the solution to further dilute the solution. The diluted solution is then able to exit the apparatus via the outlet located at the outer end of the outer chamber.

18 Claims, 2 Drawing Sheets

FERTILIZER DISPENSING APPARATUS

BACKGROUND OF THE INVENTION

1. Field of the Invention

The present invention relates generally to a fertilizer dispensing apparatus and more particularly to a fertilizer dispensing apparatus that is adapted to be removably secured to a water source which will adequately and efficiently disperse a solution during each watering of gardens, lawns, or the like, without harming the user or the environment.

2. Description of the Prior Art

Throughout the United States, gardening, including garden plants or lawn grass, is becoming one of the fastest growing hobbies. Working on a garden can provide a means of relieving stress while the results of the successful garden can be extremely satisfying as well as aesthetically pleasing.

As every gardener knows, to produce healthy plants or lawn grass, nutrients are needed. Several products are out on the market to enable a gardener to supply nutrients to the plants, lawn grass, or the like. Many of these products consist of a chemical solution in a water soluble solid which can be placed on the soil surrounding the plant or optionally can be mixed with water to produce a solution. In either method, an even distribution is difficult to obtain. The plant or lawn may receive too much fertilizer, inadvertently harming the plant, or too little fertilizer, which will hinder the plant or lawn from thriving as well as not promote effective growth. Additionally, the use of such methods are difficult and awkward to perform and utilize in order to obtain the optimum use of substance for the growing product.

As such, lawn and garden feeding apparatus have been developed for adequately and evenly dispensing a fertilizer solution during each watering. One such device is disclosed in U.S. Pat. No. 3,937,399 issued to Halley, wherein Halley discloses an apparatus which includes a chamber housing and a solid water soluble capsule. Water is adapted to enter into the chamber via an inlet to dissolve the water soluble solid capsule. Once dissolved, a solution is produced which is adapted to exit the chamber via an outlet. Though this device does alleviate the process of the consumer mixing the chemical solution, this apparatus does not guarantee an even distribution of the chemical solution for adequately feeding a lawn or plants. For example, in Halley, at the start of the process, the solution exiting the outlet will be more concentrated than the solution exiting the outlet at the end of the process. Additionally, there exists the possibility of large non-dissolved particles of the capsule escaping the chamber. These non-dissolved particles may harm, or worse, destroy the lawn or plants.

As seen, none of these previous efforts provide the benefits intended with the present invention. Additionally, prior techniques do not suggest the present inventive combination of component elements as disclosed and claimed herein, such as providing an apparatus which will adequately and efficiently disperse a water based solution without harming the user or the environment. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides an apparatus that is adapted to be removably secured to a water source for enabling a water soluble substance to be evenly and adequately distributed during each watering of gardens, lawns, or the like, without harming the user or the environment.

The apparatus of the present invention is compact, light weight and comprises an inner chamber which is housed within an outer chamber. Located within the inner chamber is a water soluble substance. The outer ends of the inner chamber are sealed with a pair of inner end caps. The outer ends of the outer chamber are sealed with a pair of outer end caps, wherein one end cap is an inlet and the opposite end cap is an outlet. A gap or space is located between the inner chamber and the outer chamber.

A plurality of apertures or channels are located within the outer end caps. At least one aperture is located within each inner end cap. These apertures located within the inner end caps are aligned with the inlet and outlet, respectively. Accordingly, to utilize the apparatus of the present invention, the user merely attaches a water source to the inlet. Water is able to enter the outer chamber and travel within the space or gap located between the outer and inner chambers. Water is also able to enter into the inner chamber via the aperture located within the inner end cap. As water flows into the inner chamber, the substance slowly dissolves. Upon dissolving, the solution of water and substance can exit the inner chamber via the opposite aperture in the second inner end cap. After exiting the aperture, the solution mixes with water traveling within the gap in order to further dilute the substance. The diluted substance exits the apparatus via the outlet. Inherently, this process provides an even displacement of solution without harming the environment.

Accordingly, it is the object of the present invention to provide for a dispensing apparatus that is adapted to be removably secured to a water source and which will automatically, safely, adequately, and efficiently disperse a chemical solution to properly provide nutrients during each watering of the lawn, garden plants, or the like.

It is another object of the present invention to provide for a dispensing apparatus that will overcome the drawbacks, deficiencies, and shortcomings of prior dispensing apparatus and methods thereof.

Still a further object of the present invention is to provide a dispensing apparatus which is not only safe for the environment but will eliminate the need for the user to contact, mix and/or measure chemical fertilizer which may be hazardous to their health. In addition, the apparatus of the present invention is ideal for those with limited dexterity, the elderly, and arthritics who find the mixing and measuring process to be laborious and difficult.

Yet another object of the present invention is to provide for a dispensing apparatus which may be stored without completely dissolving the substance within the inner cartridge to enable frequent small quantity feedings.

It is yet another object of the present invention, to be specifically enumerated herein, to provide a dispensing apparatus in accordance with the preceding objects and which will conform to conventional forms of manufacture, be of simple construction and easy to use so as to provide a device that would be economically feasible, long lasting and relatively trouble free in operation.

Although there have been many inventions related to dispensing devices, none of the inventions have become sufficiently compact, low cost, and reliable enough to become commonly used. The present invention meets the requirements of the simplified design, compact size, minimal components, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
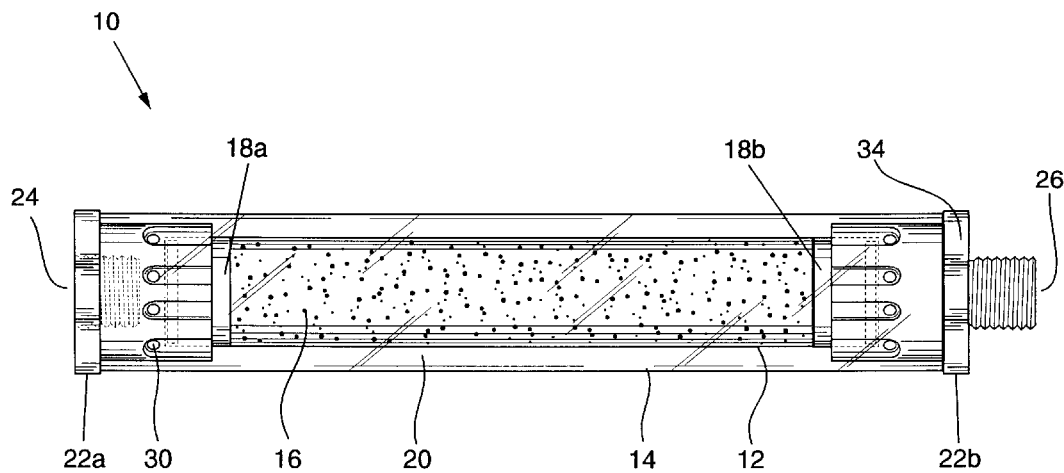
FIG. 1 is a side planar view of the dispensing apparatus of the present invention.

As seen throughout the various views of the drawings, the dispensing apparatus 10 of the present invention comprises an inner hollow chamber 12 and an outer hollow chamber 14. The inner chamber houses a water soluble substance or fertilizer 16. The inner chamber 12 and outer chamber 14 are preferably fabricated from a rigid transparent material so as to enable the user to visually determine the status of the inner chamber 12 (i.e. full, partially full, or empty).

The inner chamber 12 includes opposite ends 12a and 12b which are opened. To seal this inner chamber 12, the ends 12a and 12b, respectively, are each provided with an inner end cap 18a and 18b. To enable fluid, such as water, to enter and exit the inner chamber 12, each inner end cap 18a and 18b is provided with at least one opening.

This inner chamber 12 is housed within the outer chamber 14. As seen in the drawings, a gap or space 20 is located between the inner chamber 12 and outer chamber 14. The outer chamber includes opened ends 14a and 14b which are sealed via the use of outer end caps 22a and 22b, respectively.

The outer chamber 14 is illustrated in further detail in FIGS. 1–4. As seen, the first outer end cap 22a includes an inlet 24 which is adapted to be removably secured to a conventional water source, such as a hose or the like. As such, this inlet 24 is threaded for receiving the conventional water source, such as a conventional hose coupling assembly.

The second outer end cap 22b includes an outlet 26 which is adapted to be removably secured to a conventional feeding device, such as a lawn sprinkler or the like. As such, this outlet 26, like the inlet, is threaded for receiving such a conventional assembly.

Each end cap is illustrated in further detail in FIGS. 1, 2, 3 and 5. As seen in these drawings, each outer end cap 22a and 22b, respectively, includes an aperture 28 which acts as the inlet and outlet, respectively for the device. Accordingly, water is able to enter the device 10 through the aperture 28 located within the first outer end cap 22a, while the solution (fertilizer solution 16 dissolved in water) is adapted to escape via the aperture 28 located within the second outer end cap 22b.

Each outer end cap further includes a plurality of channels 30 which extend above the inner end caps 18a and 18b, and extends along the sides of the inner end caps and into the gap or space 20. Inherently, one open end of the channel will be located above the inner end caps while a second open end of the channel will be located below the inner end caps and be situated within the space or gap. This design and configuration of the channels 30 will provide a means of fresh water, which does not include a water soluble substance, to travel from the inlet 24 to the outlet 26 via the gap or space 20. The fresh water from the gap will again mix with the solution at the second outer end cap prior to exiting the device 10. This means of traveling and mixing will further dilute the substance upon exiting via the outlet.

Figure 2:
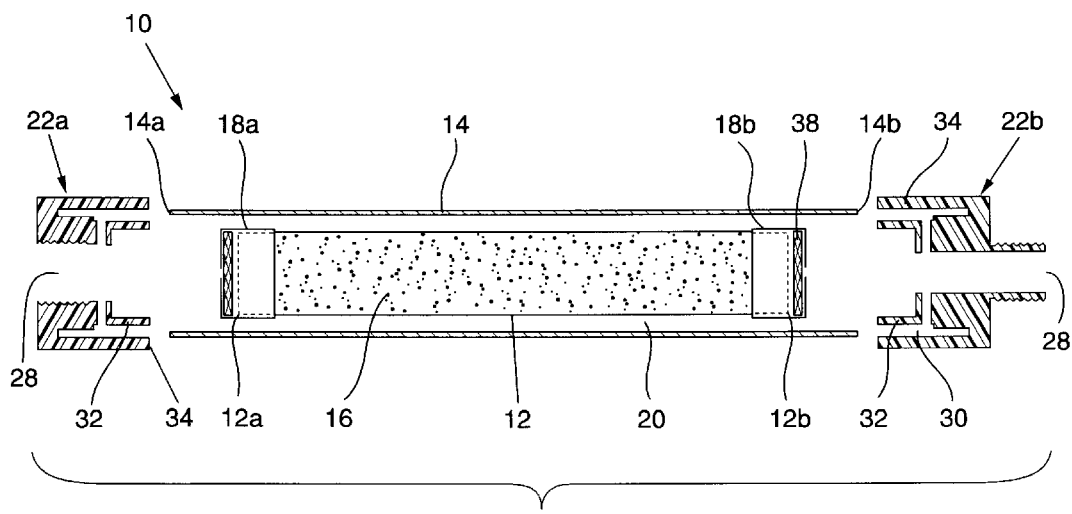
FIG. 2 is a cross sectional view of the dispensing apparatus of the present invention prior to assembly.
Figure 3:
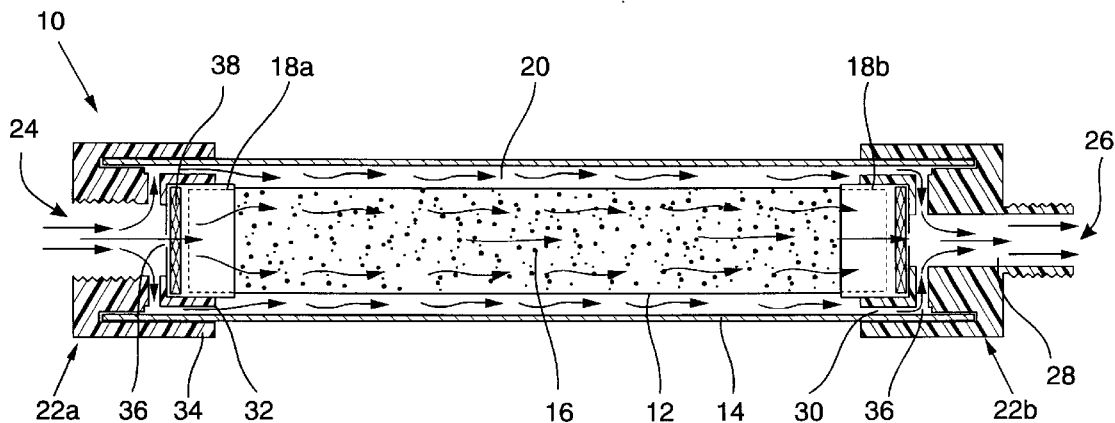
FIG. 3 is a cross sectional view of the dispensing apparatus of the present invention, assembled, and illustrating the fluid flow from the inlet to the outlet.
Figure 4:
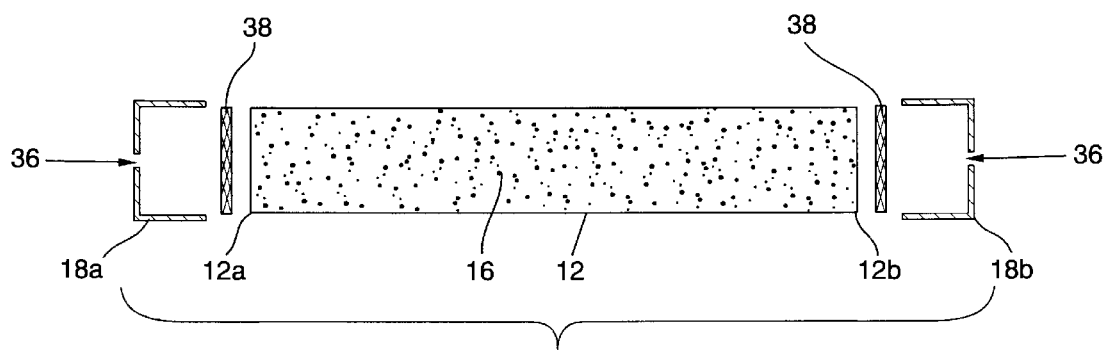
FIG. 4 is an exploded side view of the inner chamber used in the dispensing apparatus of the present invention prior to assembly.
Figure 5:
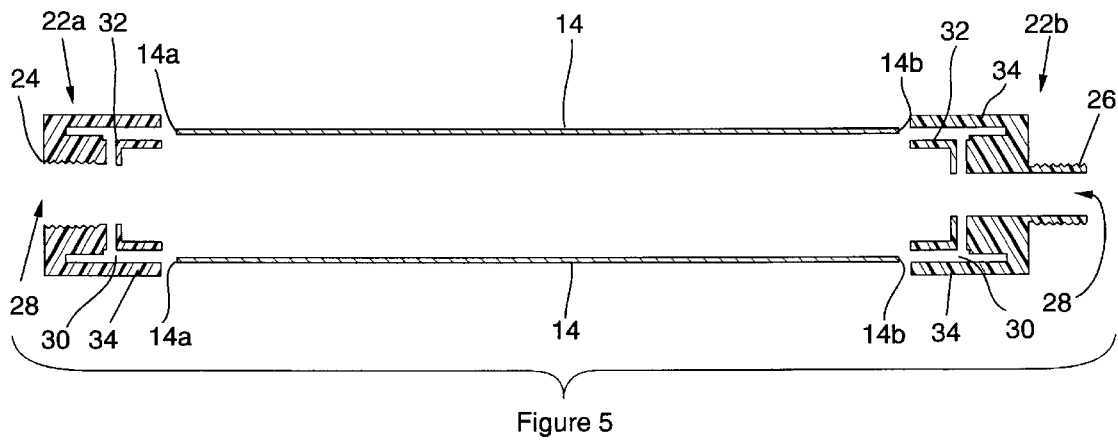
FIG. 5 is an exploded side view of the outer chamber used in the dispensing apparatus of the present invention prior to assembly.

The outer end caps 22a and 22b also include a unique design and configuration for providing the inner chamber 12 to remain in a fixed and stable position within the outer chamber 14. As seen in FIGS. 2, 3 and 5, the outer end caps 22a and 22b, each include an inner circumference member 32 that is adapted to contact and engage the outer surface of each inner end cap 18a and 18b in order to secure the inner end caps in a fixed and stable position on the inner chamber 12 as well as maintain the inner chamber in a fixed and secured position within the outer chamber 14. The inner chamber secured within the outer chamber is illustrated in FIGS. 1 and 2.

Optionally, the outer end caps 22a and 22b, may include outer circumference member 34 for extending over the outer surface of the outer chamber 14. This design will enable the outer end caps 22a and 22b to be removably secured to the outer chamber for rendering access to the interior of the device. This design for the outer circumference member 34 is illustrated in FIGS. 2, 3, and 5 and would provide for an inner chamber that is replaceable for inherently providing an apparatus which is reusable. Accordingly, the outer end caps may be internally smooth (as illustrated) for enabling the outer end caps to snap onto the outer chamber, or optionally, the outer end caps may be internally threaded for enabling the outer end caps to be threadably securable to the outer chamber. In this design of the outer end caps, at least one can be removable while the second can be permanently secured to the outer chamber. This design will still enable access to the inner chamber.

Alternatively, the outer circumference member 34 could be flushed with the outer ends 14a and 14b of the outer tube. This optional design for the outer circumference member 34 is illustrated in FIG. 1.

The design of the outer end cap 14a and 14b, illustrated in FIG. 1, would be ideal for providing for the inner hollow chamber to be permanently located within the outer hollow chamber. The outer circumference member 34, for this embodiment, would be permanently attached to the outer ends of the outer chamber via conventional means, such as, but not limited to the use of adhesives or the like. Thereby, providing a product which is not reusable and can be throw out after each use.

To prohibit the fertilizer from seeping or escaping into the gap or space 20, the hollow inner chamber is provided with inner end caps 18a and 18b, as illustrated in FIGS. 1–4. These inner end caps 18a and 18b are illustrated in further detail in FIGS. 2, 3 and 4. As seen in these drawings, each end cap 18a and 18b includes at least one aperture 36, preferably centrally aligned with the respect to the inner chamber 12. The apertures act as an entering means for the water and exiting means for the solution. These apertures 36 and are intended to be aligned with the inlet 24 and outlet 26. The inner end caps 18a and 18b can be provided with a circumference member as discussed and illustrated (see FIGS. 1–3 and 5) for the outer circumference member 34 for the outer end caps 22a and 22b. These inner end caps can be designed to be integral with the inner chamber.

For enabling a dissolved solution to flow and deter non-dissolved particles from escaping from the inner chamber 12, a filter 38 can be located at the opposite ends 12a and 12b of the inner chamber. The use of a filter will prohibit the non-dissolved elements from leaving the inner chamber. Thereby, providing for a more diluted solution to exit the apparatus of the present invention and to alleviate the possibility of harming or destroying plants, lawn or the like.

The fertilizer utilized in the inner chamber 12 can be any one of a number of water soluble fertilizer formulations available for specific treatment of lawns, flower gardens, vegetable gardens, or the like. For example, for fertilizing lawns, fertilizers having: 30%–40% nitrogen, 2%–5% phosphoric acid and 2% to 3% soluble potash may be employed. For fertilizing flower gardens, such as azalea, begonia, daffodil, gardenia, roses or the like, fertilizers having: 10%–15% nitrogen, 45%–55% phosphoric acid, and 5%–15% soluble potash may be utilized. For fertilizing vegetables, such as tomatoes, beans, carrots, corn, peppers or the like, fertilizers having: 20%–15% nitrogen, 20%–15%, Phosphoric acid, 20%–25% may be advantageously employed, a specific plant—lawns, flowers, vegetable. The above identified formulations are standard and conventional fertilizer formulations and are indicated by way of illustration only, since it is clear that a fertilizer having virtually any analysis desired may be utilized where desired. Additionally, the fertilizer can be in any desired formed, such as a solid, liquid, gel, pellets, or powder and is preferably dyed a color other than being clear or white.

To utilize the apparatus of the present invention, the user merely attaches the inlet 24 to a water source. Once secured, the water source is activated to enable water to flow freely into the apparatus 10. As seen in FIG. 2, water enters the inlet and flows into the inner chamber 12 via the aperture located in the first inner end cap 18a. This water will mix with the fertilizer 16 and cause the fertilizer to dissolve and form a solution.

Water is able to flow into the gap via channels 30 located in the first outer end cap 22a. The water in the gap or space 20 will continue to travel around the inner chamber and to the channels 30 located in the second outer end cap 22b. The solution (water and dissolved fertilizer) will exit the inner chamber 12 via the aperture located in the second inner end cap 18b and will mix with the water from the gap or space 20. The water mixing with the solution will dilute the mixture even more for enabling release in micro feeding amounts.

As water flows through the inner chamber 12 the loss of color, when viewed through the transparent inner chamber 12 and outer chamber 14, provides an indication that the nutrient concentration has fallen to a level at which replacement of the inner chamber 12 or apparatus 10 is indicated.

The inner container is designed to stored the fertilizer so that it will have a slow release rate resulting in an approximate one hour life during which time it releases nutriment in proper proportions to the stream of water flowing therethrough.

As water flows through the inner and outer chambers, the nutriment is released in micro feeding amounts. This rate may be varied by simply enlarging the openings in the inner end cap and/or optionally, enlarging the thickness of the filter, if used.

The apparatus of the present invention provides an apparatus which will slowly, but accurately release nutrients over an extended period of time. The relative release rate remains substantially constant throughout approximately seventy-five percent of the useful life of the fertilizer.

The apparatus is also designed to be utilized for short periods of time. After a particular amount of time, if the fertilizer located in the inner chamber is not dissolved, then the user merely deactivates the water source and is able to use it at a later time.

The apparatus of the present invention not only provides an efficient means of feeding nutrients to lawns, plants and the like, but this apparatus will also aid in the conservation of water. Due to the fertilizer being dissolved with water and being dispersed in a solution having a minute amount of fertilizer, there is no need to pre-treat or pre-water the lawn, plant, or the like. Additionally, since the fertilizer exiting is in such a minute amount, the life of the conventional coupling assembly attached to the outlet will not be significantly reduced due to excess corrosion. Further still, the present invention 10 is a self flushing apparatus which is light weight and user and environmentally friendly.

The apparatus of the present invention 10 can also be molded and designed as an integral unit or can have components which are integral. This will provide for at least one of the inner end caps to be integral with the inner chamber and/or provide for at least one of the outer end caps to be integral with the outer chamber.

It is noted that the apparatus of the present invention can be re-configured so that the apparatus is integral with a lawn sprinkler.

While the invention has been particularly shown and described with reference to an embodiment thereof, it will be understood by those skilled in the art that various changes in form and detail may be made without departing from the spirit and scope of the invention.

I claim:

1. A dispensing apparatus for use with a source of water and with water discharge means, said dispensing apparatus comprising:

an enclosed inner chamber housed within an outer chamber;

said outer chamber includes an inlet means and an outlet means;

said inner chamber includes an entering means and an exiting means;

a water soluble fertilizer is sealed within said inner chamber via a sealing means;

said entering means and said exiting means are located within said sealing means;

a space is located between said inner chamber and said outer chamber and said space is free from obstructions;

said inlet means and said outlet means each include a securing means for securing said inner chamber to said outer chamber, said securing means will secure said inner chamber to said outer chamber; and water flows through said inlet means and travels around said inner chamber via said space, water also flows through said sealing means via said entering means to enter said inner chamber for dissolving said water soluble fertilizer for providing a solution to form from dissolving said water soluble fertilizer mixed with water, said solution exits through said sealing means via said exiting means to exit said inner chamber, and said solution mixes with water from said space without entering said space to exit said outlet means via said securing means for providing a gradual and slow release of said water soluble fertilizer.

2. A dispensing apparatus as in claim 1 wherein said inner chamber and said outer chamber are fabricated from a durable transparent material.

3. A dispensing apparatus as in claim 1 wherein said sealing means comprises of a first inner end cap located at a first end of said inner chamber and a second inner end cap located at a second end of said inner chamber.

4. A dispensing apparatus as in claim 3 wherein said entering means has at least one aperture located in said first inner end cap and said exiting means has at least one aperture located in said second inner end cap.

5. A dispensing apparatus as in claim 4 wherein at least one aperture located in said first inner end cap is centrally aligned with said inner chamber and said inlet means, and at least one aperture located in said second inner end cap is centrally aligned with said inner chamber and said outlet means.

6. A dispensing apparatus as in claim 3 wherein said first inner end cap and said second inner end cap are integral with said inner chamber.

7. A dispensing apparatus as in claim 1 wherein said outer chamber includes a first outer end cap that is secured to a first end of said outer chamber, a second outer end cap that is secured to a second end of said outer chamber, said first outer end cap includes a central aperture which forms part of said inlet means, and said second outer end cap includes a central aperture which forms part of said outlet means.

8. A dispensing apparatus as in claim 7 wherein said central aperture in said first outer end cap includes a first accepting means for accepting a conventional water source and said central aperture in said second outer end cap includes a second accepting means for accepting a conventional water discharge means.

9. A dispensing apparatus as in claim 7 wherein said first outer end cap and said second outer end cap are removably secured to said outer chamber for providing a mean of replacing said inner chamber housing with said water soluble fertilizer.

10. A dispensing apparatus as in claim 7 wherein said first outer end cap and said second outer end cap each include a plurality of channels for enabling water to flow from the inlet means to the space and from the space to the outlet means for enabling said solution to exit said outlet means.

11. A dispensing apparatus as in claim 7 wherein said first outer end cap and said second outer end cap are integral with said outer chamber.

12. A dispensing apparatus as in claim 1 wherein a first filter is located between said entering means and said water soluble fertilizer, and a second filter is located between said fertilizer and said exiting means.

13. A dispensing apparatus as in claim 1 wherein said said inlet means and said outlet means are removably secured to said outer chamber.

14. A dispensing apparatus as in claim 1 wherein said sealing means is removably secured to said inner chamber and said said inlet means and said outlet means are removably secured to said outer chamber.

15. A dispensing apparatus for use with a source of water and with water discharge means, said dispensing apparatus comprising:

an enclosed inner chamber housed within an outer chamber;

said outer chamber includes an inlet means and an outlet means;

said inner chamber includes an entering means and an exiting means;

said entering means and said exiting means are located within said sealing means;

a space is located between said inner chamber and said outer chamber and said space is free from obstructions;

said inlet means and said outlet means each include a securing means for securing said inner chamber to said outer chamber, said securing means will secure said inner chamber to said outer chamber; and a water soluble fertilizer is sealed within said inner chamber;

said inlet means is located at a first end of said outer chamber and an outlet means is located at a second end of said outer chamber;

a first filter is located between said exiting means and said water soluble fertilizer; and water enters said inlet means and travels around said inner chamber via said space, water also flows through said entering means to enter said inner chamber for dissolving said water soluble fertilizer for providing a solution to form from dissolving said water soluble fertilizer mixed with water, said solution exits through said exiting means to exit said inner chamber, and said solution mixes with water from said space without entering said space to exit said outlet means via said securing means for providing a gradual and slow release of said water soluble fertilizer.

16. A dispensing apparatus as in claim 15 wherein said inner chamber and said outer chamber are fabricated from a durable transparent material.

17. A dispensing apparatus as in claim 15 wherein a second filter is located between said entering means and said water soluble fertilizer.

18. A dispensing apparatus as in claim 15 wherein said inlet means includes a first accepting means for accepting a conventional water source and said outlet means includes a second accepting means for accepting a conventional water discharge means.

* * * * *